United States Patent
Zeng et al.

(10) Patent No.: US 10,498,643 B2
(45) Date of Patent: Dec. 3, 2019

(54) METHOD FOR CONSTRUCTING MULTIPATH FORWARDING RULE, APPARATUS, AND SYSTEM

(71) Applicant: Huawei Technologies Co., Ltd., Shenzhen (CN)

(72) Inventors: Yulong Zeng, Shenzhen (CN); Bailin Wen, Hangzhou (CN); Jianfei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 229 days.

(21) Appl. No.: 15/353,924

(22) Filed: Nov. 17, 2016

(65) Prior Publication Data

US 2017/0070427 A1 Mar. 9, 2017

Related U.S. Application Data

(63) Continuation of application No. PCT/CN2014/078972, filed on May 30, 2014.

(51) Int. Cl.
*H04L 12/741* (2013.01)
*H04L 12/707* (2013.01)
(Continued)

(52) U.S. Cl.
CPC .............. *H04L 45/54* (2013.01); *H04L 45/24* (2013.01); *H04L 45/64* (2013.01); *H04L 47/125* (2013.01)

(58) Field of Classification Search
CPC ........ H04L 45/54; H04L 45/24; H04L 47/125
(Continued)

(56) References Cited

U.S. PATENT DOCUMENTS

| 7,636,309 B2 * | 12/2009 | Alicherry ............... H04L 45/02 370/229 |
| 2013/0322292 A1 | 12/2013 | DeCusatis et al. |
| 2014/0010083 A1 | 1/2014 | Hamdi et al. |

FOREIGN PATENT DOCUMENTS

| CN | 102594664 A | 7/2012 |
| WO | 2011119792 A2 | 9/2011 |
| WO | 2013184846 A1 | 12/2013 |

OTHER PUBLICATIONS

Open Networking Foundation, "OpenFlow Switch Specification, Version 1.3.4, Mar. 27, 2014" (Year: 2014).*

(Continued)

*Primary Examiner* — Yemane Mesfin
*Assistant Examiner* — Intekhaab A Siddiquee
(74) *Attorney, Agent, or Firm* — Conley Rose, P.C.

(57) ABSTRACT

A method for constructing a multipath forwarding rule, an apparatus, and a system. A controller invokes a multipath algorithm to generate multiple paths for a data stream; the controller generates a multiport rule of a forwarding device according to the multiple paths; the controller generates metadata according to the multiport rule of each forwarding device, where the metadata includes information for indicating at least one forwarding port of the forwarding device; the controller generates a flow entry establishment indication; the controller sends the flow entry establishment indication to a forwarding device, such that each forwarding device selects the at least one forwarding port of the forwarding device according to the flow entry establishment indication, to forward the data stream.

20 Claims, 8 Drawing Sheets

(51) Int. Cl.
 H04L 12/715 (2013.01)
 H04L 12/803 (2013.01)
(58) Field of Classification Search
 USPC .................................................. 370/230.1
 See application file for complete search history.

(56) References Cited

OTHER PUBLICATIONS

Open Networking Foundation, "OpenFlow Switch Specification, Version 1.3.4, Mar. 27, 2014" (Year: 2014) (Year: 2014).*
"OpenFlow Switch Specification," Version 1.3.4 (Protocol Version 0x04), Open Networking Foundation, Mar. 27, 2014, 171 pages.
Foreign Communication From a Counterpart Application, European Application No. 14893244.5, Extended European Search Report dated May 22, 2017, 7 pages.
Foreign Communication From a Counterpart Application, PCT Application No. PCT/CN2014/078972, English Translation of International Search Report dated Feb. 27, 2015, 2 pages.
Foreign Communication From a Counterpart Application, PCT Application No. PCT/CN2014/078972, English Translation of Written Opinion dated Feb. 27, 2015, 7 pages.
Machine Translation and Abstract of Chinese Publication No. CN103729427, Apr. 16, 2014, 8 pages.
Machine Translation and Abstract of Chinese Publication No. CN103763207, Apr. 30, 2014, 37 pages.
Foreign Communication From a Counterpart Application, Chinese Application No. 201480033010.3, Chinese Office Action dated Mar. 5, 2018, 6 pages.
Machine Translation and Abstract of Chinese Publication No. CN101047633, Oct. 3, 2007, 15 pages.
Machine Translation and Abstract of Chinese Publication No. CN101931590, Dec. 29, 2010, 10 pages.
Machine Translation and Abstract of Chinese Publication No. CN103078804, May 1, 2013, 17 pages.
Machine Translation and Abstract of Chinese Publication No. CN103200122, Jul. 10, 2013, 8 pages.

* cited by examiner

```
16 ...            ... 0
0000000000000000
0000000000000000
0000000000000000
0000000000000011
```

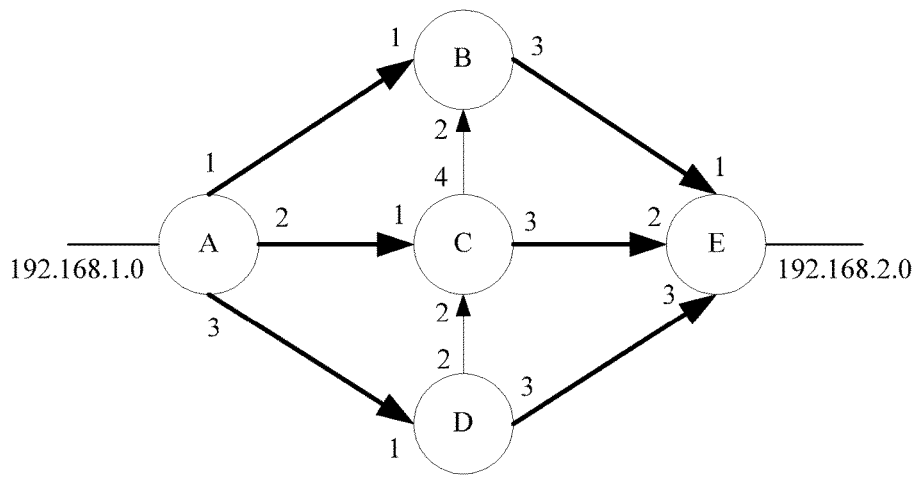
FIG. 8
| First table | | | Multipath table | |
|---|---|---|---|---|
| Match field | Action field | | Match field | Action field |
| **=** | Write-metadata indication & indication of going to a multipath table | | 00000000 00000000 ------------------------ 00000000 00000000 00000000 00000000 10000000 00000001 | Randomly select a port included in metadata |
FIG. 9
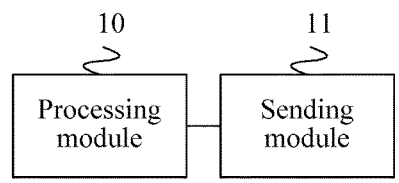
FIG. 10
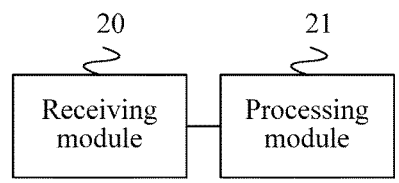
FIG. 11

METHOD FOR CONSTRUCTING MULTIPATH FORWARDING RULE, APPARATUS, AND SYSTEM

CROSS-REFERENCE TO RELATED APPLICATIONS

This application is a continuation application of international patent application number PCT/CN2014/078972 filed on May 30, 2014, which is incorporated by reference.

TECHNICAL FIELD

The present disclosure relates to the field of network communications technologies, and in particular, to a method for constructing a multipath forwarding rule, an apparatus, and a system.

BACKGROUND

With development of network technologies, a software-defined networking (SDN) technology is put forward as an innovation to a network architecture, and main technical features of the software-defined networking technology include separating forwarding from control, centralized management and control of a network, and supporting open programming to open network resources and capabilities. An objective of an SDN is to simplify management and control of a network by reconstructing a network architecture, so as to accelerate deployment of a new service. OpenFlow is a mainstream key technology for implementing an SDN, and defines an interface and a protocol for communication between a network controller and a network forwarding device. In the OpenFlow-based SDN network, a concept of a group is introduced, such that a set of a group of ports is used as a single entity, where the single entity is used to forward a packet, and a group table is used to store a group entry. In the group entry, one identifier (ID) is used to uniquely identify one group entry. A group type represents a service type supported by the group. A counter is used to collect statistics on traffic of the group. An action bucket is used to specify an action bucket associated with the group entry. Different group types may support different services. An entry of an action bucket includes an identifier, a weight, and an operation (for example, forwarding to a port) of a bucket, where the weight is used to determine a ratio of data forwarded on each forwarding path.

In the SDN network, a general method for constructing a multipath forwarding rule is: 1) defining a group, specifying that a group type is select, which represents that a data packet is forwarded by selecting a port from multiple action buckets according to a particular rule/algorithm; and specifying an action bucket of the group, for example, specifying multiple forwarding port numbers and weights; and 2) constructing a flow entry, including a match field and an action field, where an action field part is defined as pointing to an entry in a group table.

However, storage resources of the forwarding device are limited, and a quantity of hardware flow tables supported by a group table is also limited. Therefore, reuse of a group is particularly important for saving storage space. In some approaches, to reuse a group, the controller needs to query an already used group, determines, through comparison, whether a port combination in an action bucket in a historical group is consistent with that in a group to be established, and when the port combination in the action bucket in the historical group is consistent with that in the group to be established, uses an identifier of the historical group as an identifier of a newly established group. When there is a relatively large quantity of groups on which multipath forwarding is performed, there is a relatively large quantity of port combinations. Querying for the identifier of the historical group generates large overheads, affecting a time for establishing a flow table on the forwarding device, and reducing working efficiency of the controller and the forwarding device.

SUMMARY

The present disclosure provides a method for constructing a multipath forwarding rule, an apparatus, and a system, which are used to improve efficiency of constructing a multipath forwarding rule.

A first aspect of the present disclosure provides a method for constructing a multipath forwarding rule, including invoking, by a controller, a multipath algorithm to generate multiple paths for a data stream; generating, by the controller, a multiport rule of each forwarding device according to the multiple paths, where the multiport rule of each forwarding device indicates that the forwarding device corresponds to at least one forwarding port of the multiple paths; generating, by the controller, metadata according to the multiport rule of each forwarding device, where the metadata includes information for indicating the at least one forwarding port of the forwarding device; generating, by the controller, a flow entry establishment indication, where the flow entry establishment indication includes a write-metadata indication, an indication of going to a multipath table, and the metadata that corresponds to the write-metadata indication; and sending, by the controller, the flow entry establishment indication to each forwarding device, such that each forwarding device selects the at least one forwarding port of the forwarding device according to the metadata and according to the flow entry establishment indication, to forward the data stream.

With reference to the first aspect, in a first possible implementation manner, the metadata includes a port information identifier area, the port information identifier area is used to indicate information about the at least one forwarding port of the forwarding device, and each bit in the port information identifier area correspondingly indicates one forwarding port.

With reference to the first aspect or the first possible implementation manner of the first aspect, in a second possible implementation manner, before the generating, by the controller, metadata according to the multiport rule of each forwarding device, the method further includes determining, by the controller, whether a splitting ratio corresponding to the multiport rule of each forwarding device is equal, and if the splitting ratio is equal, performing the step of generating, by the controller, metadata according to the multiport rule of each forwarding device.

A second aspect of the present disclosure provides a method for constructing a multipath forwarding rule, including receiving, by a forwarding device, a flow entry establishment indication sent by a controller, where the flow entry establishment indication includes a write-metadata indication, an indication of going to a multipath table, and metadata that corresponds to the write-metadata indication; establishing, by the forwarding device, a flow entry of a first table according to the flow entry establishment indication, where an action field in the flow entry of the first table is writing the metadata that corresponds to the write-metadata indication and going to a multipath table, where the first table refers to an ingress flow table in the forwarding device; and establishing, by the forwarding device, a flow entry of the multipath table according to the write-metadata indication, where in the flow entry of the multipath table, a match field is the metadata, and an action field is sending a data stream from at least one forwarding port corresponding to the metadata.

With reference to the second aspect, in a first possible implementation manner, the metadata includes a port information identifier area, the port information identifier area is used to indicate information about the at least one forwarding port of the forwarding device, and each bit in the port information identifier area correspondingly indicates one forwarding port; and the action field is using the forwarding port as a port that is used for performing multipath forwarding to send the data stream, where the forwarding port is one to one corresponding to the information about the at least one forwarding port of the forwarding device indicated in the port information identifier area.

With reference to the first possible implementation manner of the second aspect, in a second possible implementation manner, the establishing, by the forwarding device, a flow entry of the multipath table according to the write-metadata indication includes querying, by the forwarding device, whether a flow entry including the metadata exists in the multipath table; and if the flow entry including the metadata does not exist in the multipath table, extracting, by the forwarding device according to the write-metadata indication, the information that is indicated by the port information identifier area in the metadata and that is about the at least one forwarding port of the forwarding device, and correspondingly generating the action field in the flow entry of the multipath table.

A third aspect of the present disclosure provides a controller, including a processing module configured to invoke a multipath algorithm to generate multiple paths for a data stream; generate a multiport rule of each forwarding device according to the multiple paths, where the multiport rule of each forwarding device indicates that the forwarding device corresponds to at least one forwarding port of the multiple paths; generate metadata according to the multiport rule of each forwarding device, where the metadata includes information for indicating the at least one forwarding port of the forwarding device; and generate a flow entry establishment indication, where the flow entry establishment indication includes a write-metadata indication, an indication of going to a multipath table, and the metadata that corresponds to the write-metadata indication; and a sending module configured to send the flow entry establishment indication to each forwarding device, such that each forwarding device selects the at least one forwarding port of the forwarding device according to the metadata and according to the flow entry establishment indication, to forward the data stream.

With reference to the third aspect, in a first possible implementation manner, the metadata includes a port information identifier area, the port information identifier area is used to indicate information about the at least one forwarding port of the forwarding device, and each bit in the port information identifier area correspondingly indicates one forwarding port.

With reference to the third aspect or the first possible implementation manner of the third aspect, in a second possible implementation manner, the processing module is further configured to, before generating the metadata according to the multiport rule of each forwarding device, determine whether a splitting ratio corresponding to the multiport rule of each forwarding device is equal, and if the splitting ratio is equal, generate the metadata according to the multiport rule of each forwarding device.

A fourth aspect of the present disclosure provides a forwarding device, including a receiving module configured to receive a flow entry establishment indication sent by a controller, where the flow entry establishment indication includes a write-metadata indication, an indication of going to a multipath table, and metadata that corresponds to the write-metadata indication; and a processing module configured to establish a flow entry of a first table according to the flow entry establishment indication, where an action field in the flow entry of the first table is writing the metadata that corresponds to the write-metadata indication and going to a multipath table; and further configured to establish a flow entry of the multipath table according to the write-metadata indication, where in the flow entry of the multipath table, a match field is the metadata, an action field is sending a data stream from at least one forwarding port corresponding to the metadata, and the first table refers to an ingress flow table in the forwarding device.

With reference to the fourth aspect, in a first possible implementation manner, the metadata includes a port information identifier area, the port information identifier area is used to indicate information about the at least one forwarding port of the forwarding device, and each bit in the port information identifier area correspondingly indicates one forwarding port; and the at least one forwarding port, which sends the data stream, in the action field is in a one-to-one correspondence with the at least one forwarding port, which is indicated by the port information identifier area, of the forwarding device.

With reference to the first possible implementation manner of the fourth aspect, in a second possible implementation manner, the processing module being configured to establish a flow entry of the multipath table according to the write-metadata indication is being configured to query whether a flow entry including the metadata exists in the multipath table; and if the flow entry including the metadata does not exist in the multipath table, being configured to extract, according to the write-metadata indication, the information that is indicated by the port information identifier area in the metadata and that is about the at least one forwarding port of the forwarding device, and correspondingly generate the action field in the flow entry of the multipath table.

A fifth aspect of the present disclosure provides a controller, including a processor, a memory, a bus, and a communications interface, where the memory is configured to store a computer execution instruction; the processor is connected to the memory using the bus; when the controller runs, the processor executes the computer execution instruction stored in the memory, such that the controller performs the method according to the first aspect or any possible implementation manner of the first aspect.

A sixth aspect of the present disclosure provides a forwarding device, including a processor, a memory, a bus, and a communications interface, where the memory is configured to store a computer execution instruction; the processor is connected to the memory using the bus; when the forwarding device runs, the processor executes the computer execution instruction stored in the memory, such that the forwarding device performs the method according to the second aspect or any possible implementation manner of the second aspect.

A seventh aspect of the present disclosure provides a system for constructing a multipath forwarding rule, including the controller according to the third aspect or any possible implementation manner of the third aspect and the forwarding device according to the fourth aspect or any possible implementation manner of the fourth aspect; or the controller according to the fifth aspect and the forwarding device according to the sixth aspect.

According to the method for constructing a multipath forwarding rule, an apparatus, and a system that are provided in the embodiments of the present disclosure, a controller invokes a multipath algorithm to generate multiple paths for a data stream; then, the controller generates a multiport rule of each forwarding device according to the multiple paths, where the multiport rule of each forwarding device indicates that the forwarding device corresponds to at least one forwarding port of the multiple paths; the controller generates metadata according to the multiport rule of each forwarding device; the controller generates a flow entry establishment indication, where the flow entry establishment indication includes a write-metadata indication, an indication of going to a multipath table, and metadata that corresponds to the write-metadata indication; the controller sends the flow entry establishment indication to each forwarding device, such that each forwarding device selects the at least one forwarding port of the forwarding device according to the metadata and according to the flow entry establishment indication, to forward the data stream. Because a forwarding device may reuse a port combination according to metadata, after generating a flow entry, a controller does not need to query an already used group, determines, through comparison, whether a port combination in an action bucket in a historical group is consistent with that in a group to be established, and directly sends the flow entry to each forwarding device, thereby shortening a decision time of the controller.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

FIG. 8 is a schematic diagram of multiple paths according to an embodiment of the present disclosure;

FIG. 9 is a schematic diagram of multiple flow tables on a side of a forwarding device according to an embodiment of the present disclosure;

FIG. 10 is a schematic structural diagram of a controller according to an embodiment of the present disclosure;

FIG. 11 is a schematic structural diagram of a forwarding device according to an embodiment of the present disclosure.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

An application scenario of the embodiments of the present disclosure is a typical SDN network scenario that includes a network controller and a network forwarding device. A data channel (for example, a Transmission Control Protocol (TCP) connection) between the network controller and the forwarding device is established, and communication is performed between the network controller and the forwarding device using a communications standard (a controller-forwarding device communications protocol, for example, OpenFlow). The network controller implements control on a data stream forwarding behavior by operating a flow table (including a common flow table and a group table) on the forwarding device.

Figure 1:
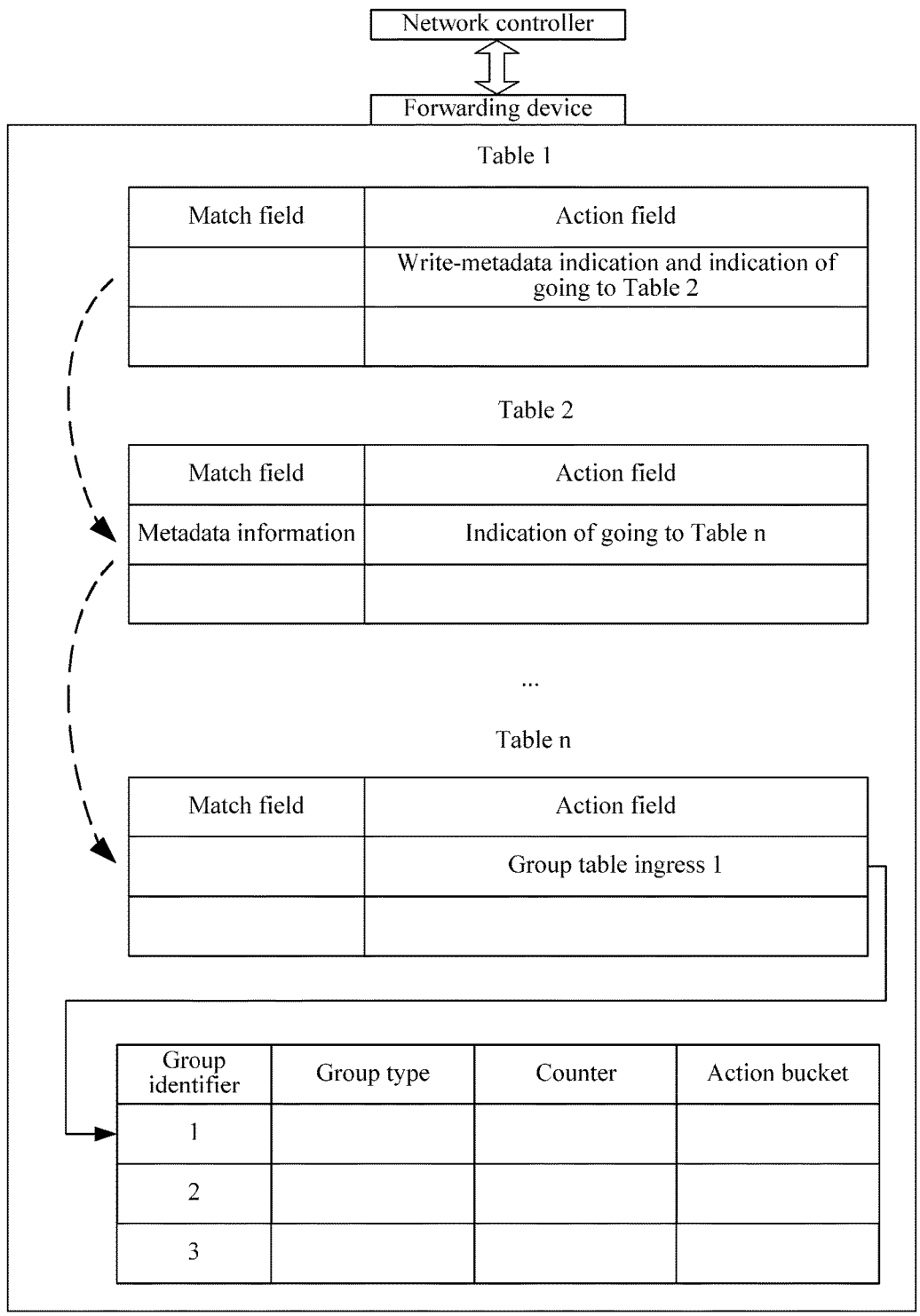
FIG. 1 is a schematic diagram of a processing procedure of forwarding data using multiple paths.

In some approaches, if the forwarding device uses a single flow table to construct a channel on which a data packet is processed, and for a single flow table into which multiple match entries are combined, the single flow table may have M×N flow entries. However, if multiple flow tables are used to construct a channel on which a data packet is processed, a scale of the multiple flow tables is M+N. The forwarding device forms, by means of construction of the multiple flow tables, a channel on which a data packet is processed, which may achieve objectives of narrowing down flow table space, enhancing processing capability of a complex service, and improving processing performance. FIG. 1 is a schematic diagram of a processing procedure of forwarding data using multiple paths. As shown in FIG. 1, after multiple flow tables are introduced, processing on a data packet by the forwarding device may involve matching for multiple flow tables. Matching logic of multiple flow tables may include: 1) values of a field A and a field B in a data packet header are matched in Table 1, and a value of a field C is matched in Table 2; 2) a field A and a field B in a data packet header are matched in Table 1, some new feature information is added to a flow entry, is stored in metadata, and is transferred to Table 2, information about the metadata is matched in Table 2, and a subsequent operation is performed according to a matching result; 3) after matching is completed in Table n, go to an entry of a group table, to perform matching for the group table and a corresponding operation. It should be pointed out that Table 1, Table 2, Table n, the field A, the field B, and the field C are used as identifiers only. An actual case may be that numbers of different tables, names of match fields, and a quantity of match fields may also be in various different combinations.

The controller needs to perform intelligent management and control on the forwarding device, and has a hardware requirement that a node having a computing capability and a network communications capability may be deployed on a desktop computer and a server, or may be deployed in a virtualization environment, for example, a virtual machine.

The forwarding device requires a computing capability to process protocol logic, and needs to have a data packet forwarding capability. A processing chip of the forwarding device may be an application-specific integrated circuit (ASIC), a network processor (NP), or an X86-based intelligent network interface card chip.

In the embodiments of the present disclosure, based on the foregoing scenario, an organization form and a processing procedure of multiple flow tables are enhanced and optimized, to implement quick establishment of a flow entry. A single table of multiple flow tables is used as a multipath table, to implement a function similar to that of a group table. A match field of the multipath table is metadata. It should be noted that, the metadata differs from flat data, and refers to that a combination of some bits of the data has a specific meaning, for example, each bit corresponds to a port number, but the flat data has no meaning unless being used as a whole. An action field implements a function of an action bucket in a group table. The metadata includes information about a forwarding port/forwarding port combination, and a bit being 1 in the metadata represents that the action bucket includes the port, that is, the port may be used as a port for performing multipath forwarding. A method for constructing a multipath forwarding rule and an apparatus that are provided in the embodiments of the present disclosure are described below using specific embodiments.

Figures 2, 3:
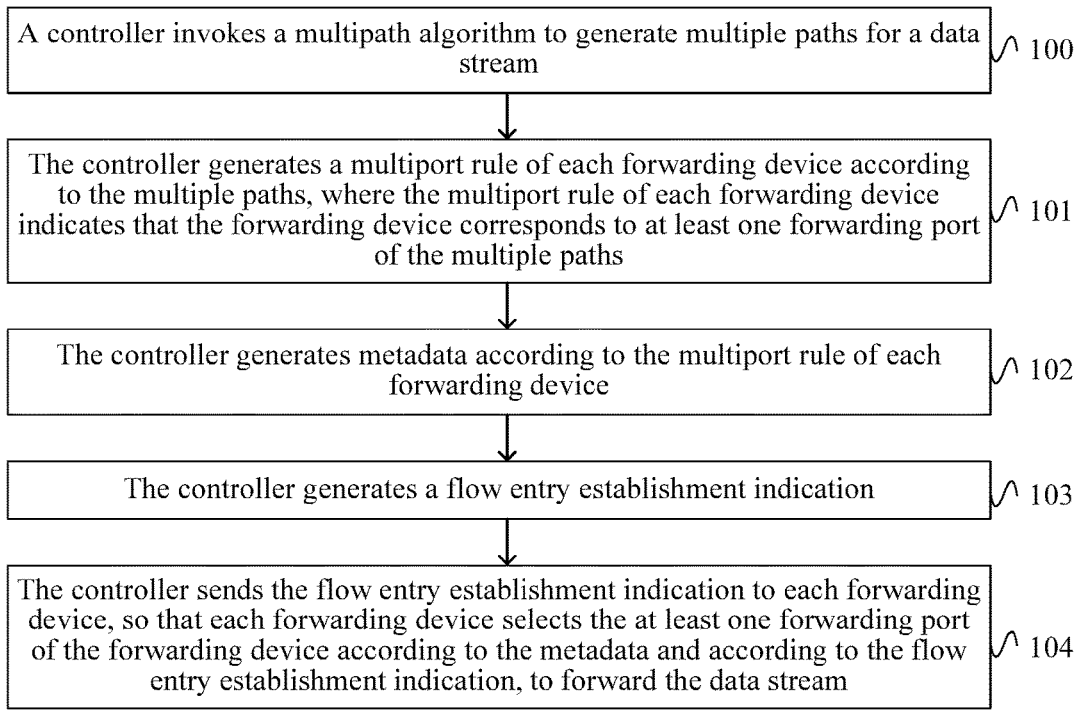
FIG. 2 is a schematic flowchart of a method for constructing a multipath forwarding rule according to an embodiment of the present disclosure.
FIG. 3 is a schematic diagram of a port information identifier area according to an embodiment of the present disclosure.

FIG. 2 is a schematic flowchart of a method for constructing a multipath forwarding rule according to an embodiment of the present disclosure. This embodiment of the present disclosure is executed by a controller. Referring to FIG. 1, the method includes the following steps:

Step 100: The controller invokes a multipath algorithm to generate multiple paths for a data stream.

Using a multipath algorithm is not limited in this embodiment.

Step 101: The controller generates a multiport rule of each forwarding device according to the multiple paths, where the multiport rule of each forwarding device indicates that the forwarding device corresponds to at least one forwarding port of the multiple paths.

Step 102: The controller generates metadata according to the multiport rule of each forwarding device.

The metadata includes information for indicating the at least one forwarding port of the forwarding device.

Step 103: The controller generates a flow entry establishment indication.

The flow entry establishment indication includes a write-metadata indication, an indication of going to a multipath table, and metadata that corresponds to the write-metadata indication.

The write-metadata indication and the indication of going to a multipath table are both operations, the write-metadata indication is used to instruct the forwarding device to write the metadata that corresponds to the write-metadata indication to a multipath table, and the indication of going to a multipath table is used to instruct a data packet to go from a first table of the forwarding device to a multipath table.

Step 104: The controller sends the flow entry establishment indication to each forwarding device, such that each forwarding device selects the at least one forwarding port of the forwarding device according to the metadata and according to the flow entry establishment indication, to forward the data stream.

According to the method for constructing a multipath forwarding rule provided in this embodiment, a controller invokes a multipath algorithm to generate multiple paths for a data stream; then, the controller generates a multiport rule of each forwarding device according to the multiple paths, where the multiport rule of each forwarding device indicates that the forwarding device corresponds to at least one forwarding port of the multiple paths; the controller generates metadata according to the multiport rule of each forwarding device; the controller generates a flow entry establishment indication, where the flow entry establishment indication includes a write-metadata indication, an indication of going to a multipath table, and metadata that corresponds to the write-metadata indication; the controller sends the flow entry establishment indication to each forwarding device, such that each forwarding device selects the at least one forwarding port of the forwarding device according to the metadata and according to the flow entry establishment indication, to forward the data stream. Because a forwarding device may reuse a port combination according to metadata, after generating a flow entry, a controller does not need to query an already used group, determines, through comparison, whether a port combination in an action bucket in a historical group is consistent with that in a group to be established, and directly sends the flow entry to each forwarding device, thereby shortening a decision time of the controller.

Preferably, the metadata includes a port information identifier area, the port information identifier area is used to indicate information about the at least one forwarding port of the forwarding device, and each bit in the port information identifier area correspondingly indicates one forwarding port.

Specifically, each bit in the port information identifier area correspondingly indicates a port for performing multipath forwarding. FIG. 3 is a schematic diagram of a port information identifier area according to an embodiment of the present disclosure. Referring to FIG. 3, some bits, for example, 48 bits, in metadata are used as a port information identifier area, and when a bit is set to 1, it represents that a port corresponding to the bit is used as a port for performing multipath forwarding. As shown in FIG. 3, a first bit and a second bit are set to 1, representing that the entry may support multipath forwarding of a first port and a second port. When a quantity of ports is relatively large, some bits of the metadata may be used to represent slot numbers. A quantity of bits of the metadata may also be customized (that is, a quantity of bits is increased) to adapt to a requirement of a special switch.

Figure 4:
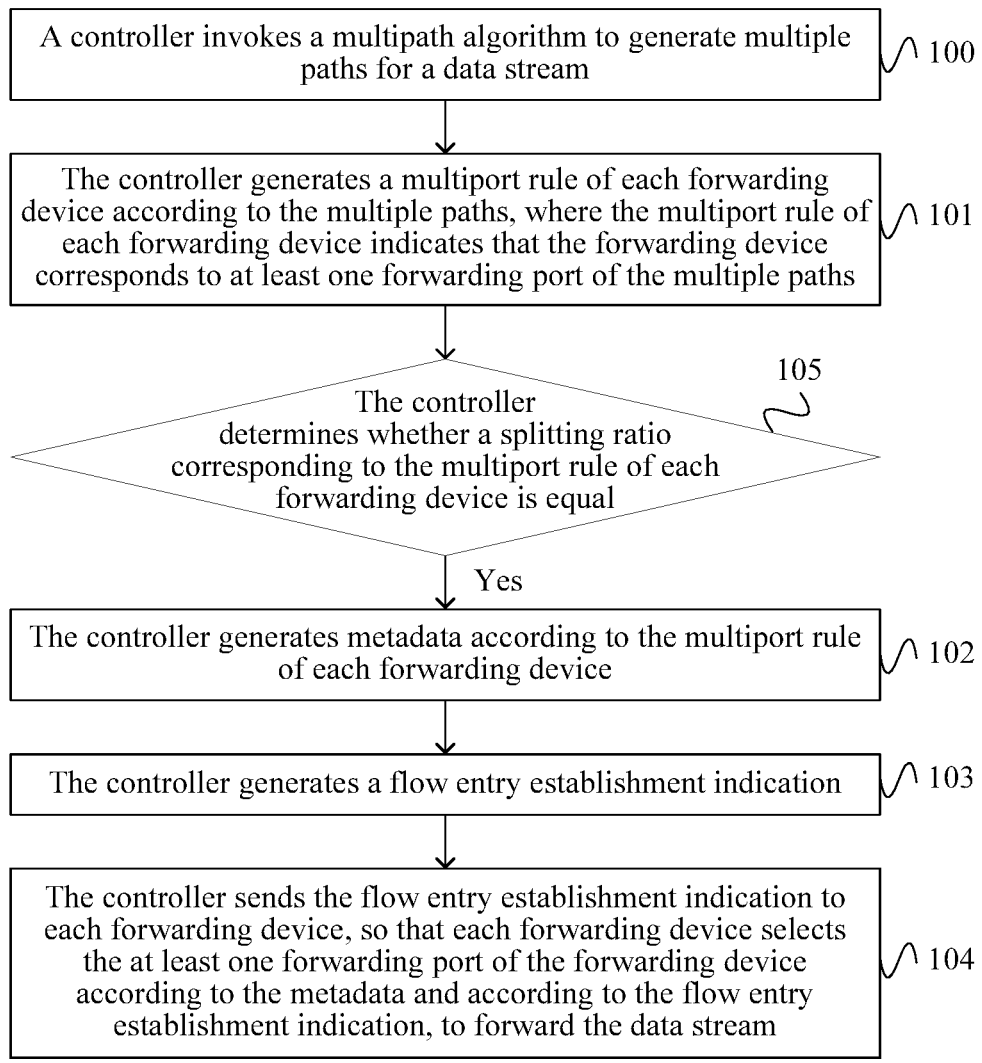
FIG. 4 is a schematic flowchart of a method for constructing a multipath forwarding rule according to an embodiment of the present disclosure.

Based on FIG. 2, FIG. 4 is a schematic flowchart of a method for constructing a multipath forwarding rule according to an embodiment of the present disclosure. Referring to FIG. 4, before step 102, the method further includes the following step:

Step 105: The controller determines whether a splitting ratio corresponding to the multiport rule of each forwarding device is equal.

If the splitting ratio is equal, step 102 in FIG. 2 is performed. If the splitting ratio corresponding to the multiport rule of each forwarding device is unequal, the controller uses the metadata as an index, and locates, according to the metadata, group tables having a same splitting ratio.

It should be noted that, to ensure reuse of a group, the controller needs to maintain a group table for each forwarding device. The metadata is used as the index, and all groups forwarded from a same port combination are linked to a same index. Because each group may include different splitting ratios, for example, a weight of each action bucket (action bucket) is different, groups having different splitting ratios needs to be distinguished. If steps shown in FIG. 2 are used, information about a splitting ratio needs to be added to the flow entry sent by the controller to the forwarding device, which therefore increases implementation difficulty of the metadata. For a scenario in which each group has a different splitting ratio, the metadata is used as an index, which can quickly query group sets of same port combinations, such that the group sets of same port combinations are quickly located, result space of querying is narrowed down, and therefore, a query time is shortened.

Further, after group tables having same splitting ratios are located, group identifiers (Group ID) in the group tables are used as flow entries, and are sent to the forwarding device, such that the forwarding device adds the group identifier into an action field of a first table.

Figure 5:
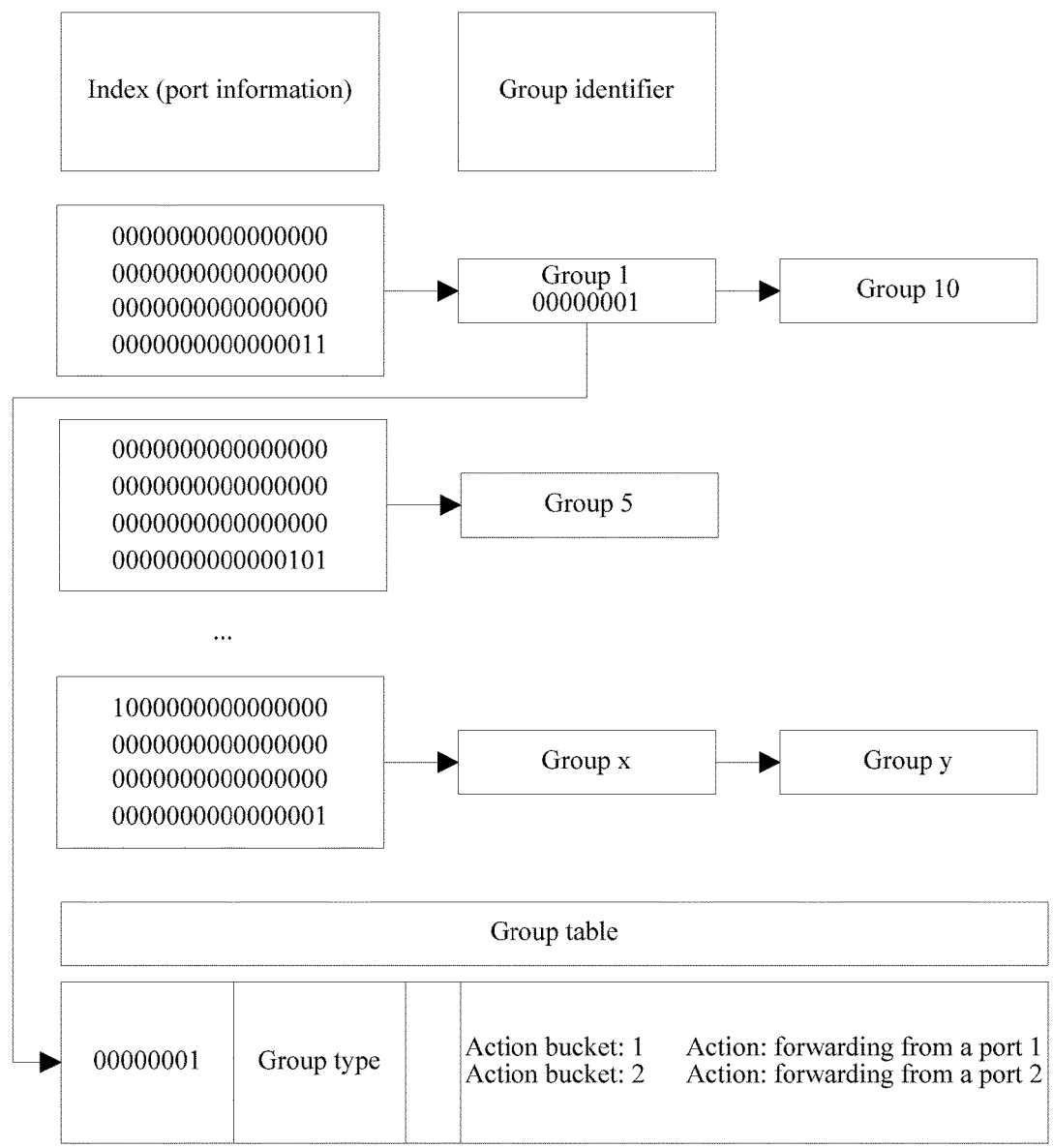
FIG. 5 is a schematic flowchart of another method for constructing a multipath forwarding rule according to an embodiment of the present disclosure.

FIG. 5 is a schematic flowchart of another method for constructing a multipath forwarding rule according to an embodiment of the present disclosure. Referring to FIG. 5, metadata (metadata) is used as an index. For example, indexes of the last 16 bits being 0000000000000011 of metadata in FIG. 5 correspond to group sets forwarded from a port 1 and a port 2, and groups in a same group set may be connected using a linked list. When constructing a rule for a first table, the controller first constructs metadata or an index according to a corresponding port combination, finds a corresponding group identifier (ID) based on the index, and uses the group identifier as an operation of a flow entry in the first table.

It should be noted that step 105, the solution in which the metadata is used as the index, step 106, and all steps shown in FIG. 2 may be implemented separately and independently, or may be implemented in a combination form. For performing splitting with an unequal ratio, a ratio or a weight of splitting needs to be transferred in the metadata, which increases complexity of logic of identifying the metadata by the forwarding device, and introduces more overheads. Therefore, for a scenario including both splitting with an equal ratio, such as equal-cost multi-path routing (ECMP), and splitting with an unequal ratio, the solution shown in FIG. 2 and the solution shown in FIG. 5 may be combined and used. That is, for a flow table rule for performing splitting with an equal ratio, group table information does not need to be stored on a side of the controller, and the flow entry establishment indication is directly delivered to the forwarding device; for a flow table rule including different splitting ratios, the solution shown in FIG. 5 may be used, an index of the metadata are added, and a found group identifier is used as an action of the rule for the first table. In addition, traversing of a group is not performed, and in this scenario, directly using a new group identifier is also a feasible solution.

Figure 6:
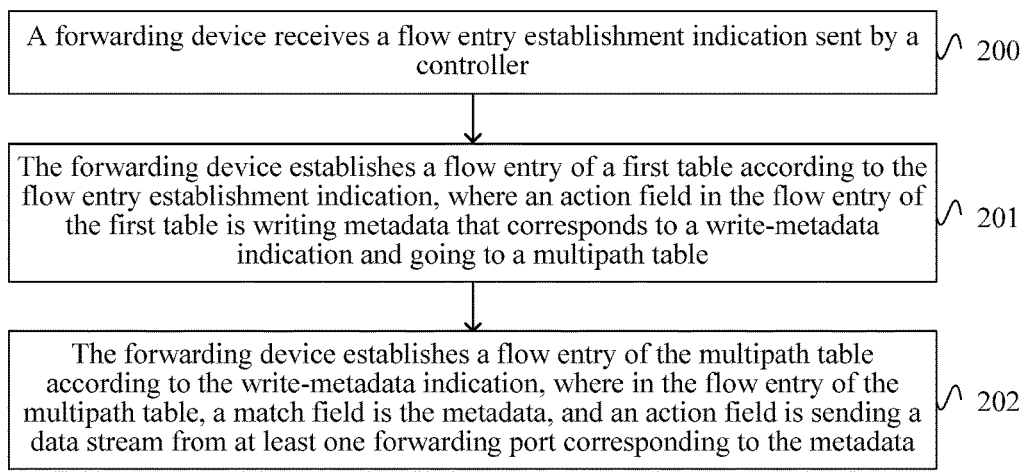
FIG. 6 is a schematic flowchart of another method for constructing a multipath forwarding rule according to an embodiment of the present disclosure.

FIG. 6 is a schematic flowchart of another method for constructing a multipath forwarding rule according to an embodiment of the present disclosure. This embodiment of the present disclosure is executed by a forwarding device. Referring to FIG. 6, the method includes the following steps:

Step 200: The forwarding device receives a flow entry establishment indication sent by a controller.

Specifically, the flow entry establishment indication includes a write-metadata indication, an indication of going to a multipath table, and metadata that corresponds to the write-metadata indication.

Step 201: The forwarding device establishes a flow entry of a first table according to the flow entry establishment indication, where an action field in the flow entry of the first table is writing metadata that corresponds to a write-metadata indication and going to a multipath table.

The first table refers to an ingress flow table in the forwarding device. The writing the write-metadata indication and the going to a multipath table are both operations, the forwarding device rewrites, to the multipath table according to the write-metadata indication, the metadata that corresponds to the write-metadata indication, and the forwarding device transfers a data packet from a first table to the multipath table according to the indication of going to a multipath table.

Step 202: The forwarding device establishes a flow entry of the multipath table according to the write-metadata indication, where in the flow entry of the multipath table, a match field is the metadata, and an action field is sending a data stream from at least one forwarding port corresponding to the metadata.

According to the method for constructing a multipath forwarding rule provided in this embodiment of the present disclosure, a forwarding device receives a flow entry establishment indication sent by a controller, the forwarding device establishes a flow entry of a first table according to the flow entry establishment indication, where an action field in the flow entry of the first table is writing metadata that corresponds to a write-metadata indication and going to a multipath table, and finally, the forwarding device establishes a flow entry of the multipath table according to the write-metadata indication, where in the flow entry of the multipath table, a match field is the metadata, and an action field is sending a data stream from at least one forwarding port corresponding to the metadata. Reuse of the forwarding port is implemented according to the metadata, and storage space of the forwarding device is saved. Moreover, because the match field is the metadata, the action field may include a series of actions, such that equipment vendors can perform hardware optimization for a multipath table to improve performance, for example, optimizing port information identification of a forwarding port, and optimizing implementation of a port selection algorithm. Different from conventional ECMP, a forwarding device implements a solution of a group or a similar function, which easily extends a new characteristic. For example, a series of actions are added before a data packet is forwarded to a port, such that the controller more flexibly controls a forwarding behavior.

Further, the metadata in FIG. 6 includes a port information identifier area, the port information identifier area is used to indicate information about the at least one forwarding port of the forwarding device, and each bit in the port information identifier area correspondingly indicates one forwarding port; and the action field is using the forwarding port as a port that is used for performing multipath forwarding to send the data stream, where the forwarding port is one to one corresponding to the information about the at least one forwarding port of the forwarding device indicated in the port information identifier area.

Step 202 further includes:

The forwarding device queries whether a flow entry including the metadata exists in the multipath table.

Specifically, if the flow entry including the metadata does not exist in the multipath table, the forwarding device extracts, according to the write-metadata indication, the information that is indicated by the port information identifier area in the metadata and that is about the at least one forwarding port of the forwarding device, and correspondingly generates an action field in the flow entry of the multipath table.

Figure 7:
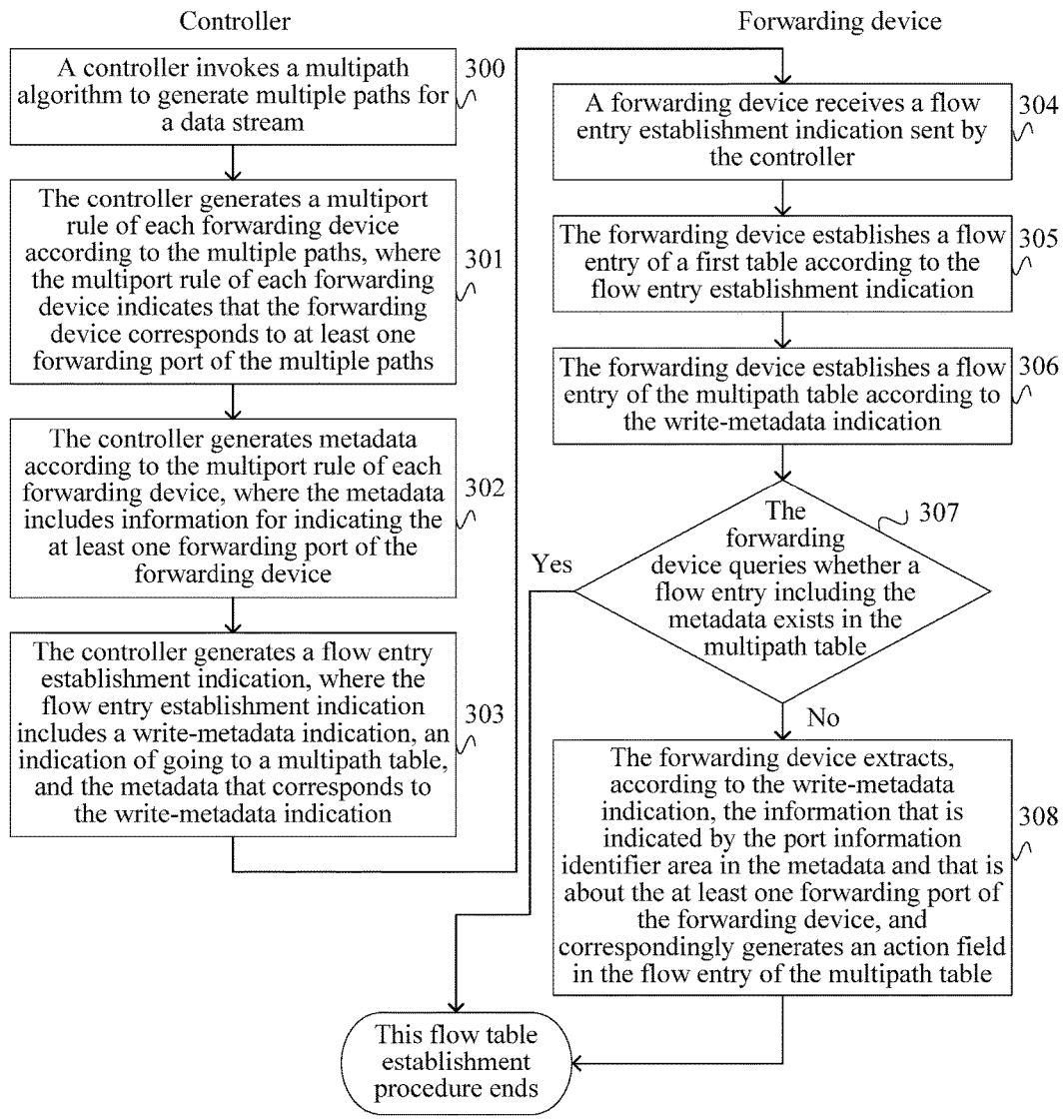
FIG. 7 is a schematic flowchart of another method for constructing a multipath forwarding rule according to an embodiment of the present disclosure.

FIG. 7 is a schematic flowchart of another method for constructing a multipath forwarding rule according to an embodiment of the present disclosure. With reference to a controller and a forwarding device, referring to FIG. 7, an interaction between the controller and the forwarding device is described. The method includes the following steps:

Step 300: The controller invokes a multipath algorithm to generate multiple paths for a data stream.

Specifically, the controller generates multiple paths for a given stream based on a multipath algorithm. The multipath algorithm may be any graph algorithm, such as a modified Dijkstra algorithm or a K-shortest-path algorithm. In addition, after full mesh topology data (UP/DOWN information of a link, available bandwidth, a delay, and the like), various service traffic requirements, and a priority are obtained, route calculation becomes a planning problem, and the multipath algorithm may use a mathematic planning algorithm, for example, linear programming (LP) for calculation. FIG. 8 is a schematic diagram of multiple paths according to an embodiment of the present disclosure. As shown in FIG. 8, assuming that a stream f is defined as all data packets that match a source Internet Protocol (IP) address 192.168.1.0 and a destination IP address 192.168.2.0. Calculation is performed using the multipath algorithm, to obtain two paths: A→B→E and A→C→E. It should be pointed out that the obtained two paths are only one case of the multiple paths in this example, and multiple cases such as A→D→E and A→C→B→E may be further included. This case is used only to describe a problem, and other cases are not listed one by one.

Step 301: The controller generates a multiport rule of each forwarding device according to the multiple paths, where the multiport rule of each forwarding device indicates that the forwarding device corresponds to at least one forwarding port of the multiple paths.

Specifically, the controller converts a result obtained through calculation in step 300 into a multiport rule of each forwarding device. For example, for a forwarding device A, a forwarding rule corresponding to the stream f (SRC IP:192.168.1.0, DST IP:192.168.2.0) is:

Match field: Source IP address=192.168.1.0/24, and
Destination IP address=192.168.2.0/24

It should be pointed out that a mask having "/24" bits indicates matching for an IP address segment, and the forwarding device not only may support accurate matching of an IP address or another data packet header field, but also may support wildcard-matching with a mask. It can be known according to the result of step 300 that, a flow entry, which is delivered by the controller to the forwarding device A, for the stream f may be forwarded from both a port 1 and a port 2.

Step 302: The controller generates metadata according to the multiport rule of each forwarding device, where the metadata includes information for indicating the at least one forwarding port of the forwarding device.

Step 303: The controller generates a flow entry establishment indication, where the flow entry establishment indication includes a write-metadata indication, an indication of going to a multipath table, and the metadata that corresponds to the write-metadata indication. The controller sends the flow entry establishment indication to each forwarding device.

Specifically, the controller adds multiport information to the metadata, and constructs the flow entry establishment indication including the write-metadata indication and the indication of going to a multipath table. Specifically, some bits, for example, 48 bits, in the metadata are used as a port information identifier area, and when a bit is set to 1, it represents that a port corresponding to the bit is used as a port for performing multipath forwarding. As shown in FIG. 3, a first bit and a second bit are set to 1, representing that the entry may support multipath forwarding of a first port and a second port. When a quantity of ports is relatively large, some bits of the metadata may be used to represent slot numbers. A quantity of bits of the metadata may also be customized (that is, a quantity of bits is increased) to adapt to a requirement of a special switch.

Specifically, a protocol followed between the controller and the forwarding device may include, but is not limited to, OpenFlow, Path Computation Element Communication Protocol (PCEP), Network Configuration Protocol (Netconf), Insight Remote Support (IRS), Extensible Messaging and Presence Protocol (XMPP), and the like, as long as it is ensured that both the controller and the forwarding device can correctly parse a protocol packet and extract a forwarding rule from the protocol packet.

Step 304: The forwarding device receives a flow entry establishment indication sent by the controller.

The forwarding device receives a data packet that is sent by the controller and that includes a forwarding rule, performs protocol parsing, and extracts an internal flow entry establishment indication, where the flow entry establishment indication includes the write-metadata indication, the indication of going to a multipath table, and the metadata that corresponds to the write-metadata indication.

Step 305: The forwarding device establishes a flow entry of a first table according to the flow entry establishment indication.

Specifically, an action field in the flow entry of the first table is writing the metadata that corresponds to the write-metadata indication and going to a multipath table, where the first table refers to an ingress flow table in the forwarding device. FIG. 8 is a schematic structural diagram of a first table and a multipath table according to an embodiment of the present disclosure. Referring to FIG. 8, specifically, the first table refers to an ingress flow table, which includes multiple flow tables, in the forwarding device, and after matching for the first table is completed, matching for another flow table may be performed subsequently, thereby implementing pipelining processing to enhance a processing capability and a compression capability for a complex service. The forwarding device establishes a flow entry, and for a device supporting an OpenFlow protocol, only a flow entry including two operations: a write-metadata indication and an indication of going to a multipath table needs to be stored in a first table (an OpenFlow flow table) of the forwarding device, and the first table may be a hardware flow table, or may be a software flow table. For a device that does not support OpenFlow, logic of a write-metadataindication and an indication of going to a multipath table may be embedded in processing logic of the forwarding device, as long as it is ensured that forwarding can be performed according to the two pieces of logic when data packet matching is performed.

Step 306: The forwarding device establishes a flow entry of the multipath table according to the write-metadata indication.

Specifically, in the flow entry of the multipath table, a match field is the metadata, and an action field is sending a data stream from the at least one forwarding port corresponding to the metadata. The multipath table may be a flow table similar to a group table. Specifically, a select-type (group type) function in the group table needs to be implemented, and at least a function of an action bucket having an equal weight is implemented. In another embodiment of the present disclosure, the multipath table is a special function table for performing only multipath forwarding, the match field is the metadata, and a forwarding action completely depends on port information included in the metadata, for example, randomly selecting a port from multiple ports for forwarding, or determining a forwarding port based on a hash function of some fields of a header. In another embodiment of the present disclosure, a match field of a flow table rule in a multipath table is metadata, and a corresponding action is completing selecting, based on an algorithm, a specific port of ports included in the metadata, and is not necessarily limited to an implementation manner of an action bucket. For example, multipath forwarding logic is embedded in firmware in the forwarding device.

Step 307: The forwarding device queries whether a flow entry including the metadata exists in the multipath table.

Specifically, when the forwarding device finds, from the multipath table, the flow entry corresponding to the metadata, it represents that original multipath table logic may be reused, and this flow table establishment procedure ends. If the forwarding device does not find the flow entry, step 308 is performed.

Step 308: The forwarding device extracts, according to the write-metadata indication, the information that is indicated by the port information identifier area in the metadata and that is about the at least one forwarding port of the forwarding device, and correspondingly generates an action field in the flow entry of the multipath table.

It should be noted that, the action field may include multiple action buckets, each action bucket corresponds to one action, and when multipath forwarding is performed, because data needs to be forwarded to multiple ports, each forwarding port corresponds to one action bucket.

FIG. 9 is a schematic diagram of multiple flow tables on a side of a forwarding device according to an embodiment of the present disclosure. As shown in FIG. 9, a first table established by a forwarding device is on the left, and content of a flow entry of the table is a write-metadata indication and an indication of going to a multipath table. The forwarding device forwards a corresponding data packet to a multipath table (multipath table) according to the flow entry, that is, a table on the right side in FIG. 8. In the multipath table, a match field is metadata, and an action field is randomly selecting a port included in the metadata. For example, a first bit and a sixteenth bit of the metadata in FIG. 8 are 1, representing that a port 1 or a port 16 may be selected.

FIG. 10 is a schematic structural diagram of a controller according to an embodiment of the present disclosure. The controller can perform steps shown in FIG. 4. Referring to FIG. 10, the controller includes a processing module 10 and a sending module 11.

The processing module 10 is configured to invoke a multipath algorithm to generate multiple paths for a data stream; generate a multiport rule of each forwarding device according to the multiple paths, where the multiport rule of each forwarding device indicates that the forwarding device corresponds to at least one forwarding port of the multiple paths; generate metadata according to the multiport rule of each forwarding device, where the metadata includes information for indicating the at least one forwarding port of the forwarding device; and generate a flow entry establishment indication, where the flow entry establishment indication includes a write-metadata indication, an indication of going to a multipath table, and the metadata that corresponds to the write-metadata indication.

The sending module 11 is configured to send the flow entry establishment indication to each forwarding device, such that each forwarding device selects the at least one forwarding port of the forwarding device according to the metadata and according to the flow entry establishment indication, to forward the data stream.

According to the controller provided in this embodiment, the processing module invokes a multipath algorithm to generate multiple paths for a data stream; generates a multiport rule of each forwarding device according to the multiple paths, where the multiport rule of each forwarding device indicates that the forwarding device corresponds to at least one forwarding port of the multiple paths; generates metadata according to the multiport rule of each forwarding device, where the metadata includes information for indicating the at least one forwarding port of the forwarding device; and generates a flow entry establishment indication, where the flow entry establishment indication includes a write-metadata indication, an indication of going to a multipath table, and the metadata that corresponds to the write-metadata indication; the sending module sends the flow entry establishment indication to each forwarding device, such that each forwarding device selects the at least one forwarding port of the forwarding device according to the metadata and according to the flow entry establishment indication, to forward the data stream. Because a forwarding device may reuse a port combination according to metadata, after generating a flow entry, the processing module does not need to query an already used group, determines, through comparison, whether a port combination in an action bucket in a historical group is consistent with that in a group to be established, and directly sends the flow entry to each forwarding device, thereby shortening a decision time of the controller.

Preferably, the metadata includes a port information identifier area, the port information identifier area is used to indicate information about the at least one forwarding port of the forwarding device, and each bit in the port information identifier area correspondingly indicates one forwarding port.

Optionally, the processing module 10 is further configured to, before generating the metadata according to the multiport rule of each forwarding device, determine whether a splitting ratio corresponding to the multiport rule of each forwarding device is equal, and if the splitting ratio is equal, generate the metadata according to the multiport rule of each forwarding device.

If the splitting ratio corresponding to the multiport rule of each forwarding device is unequal, the processing module 10 is further configured to use the metadata as an index, and locate, according to the metadata, group tables having a same splitting ratio.

FIG. 11 is a schematic structural diagram of a forwarding device according to an embodiment of the present disclosure. The forwarding device can perform steps shown in FIG. 6. Referring to FIG. 11, the forwarding device includes a receiving module 20 and a processing module 21.

The receiving module 20 is configured to receive a flow entry establishment indication sent by a controller, where the flow entry establishment indication includes a write-metadata indication, an indication of going to a multipath table, and metadata that corresponds to the write-metadata indication.

The processing module 21 is configured to establish a flow entry of a first table according to the flow entry establishment indication, where an action field in the flow entry of the first table is writing the metadata that corresponds to the write-metadata indication and going to a multipath table; and is further configured to establish a flow entry of the multipath table according to the write-metadata indication, where in the flow entry of the multipath table, a match field is the metadata, an action field is sending a data stream from at least one forwarding port corresponding to the metadata, and the first table refers to an ingress flow table in the forwarding device.

According to the forwarding device provided in this embodiment of the present disclosure, the receiving module receives a flow entry establishment indication sent by a controller, where the flow entry establishment indication includes a write-metadata indication, an indication of going to a multipath table, and metadata that corresponds to the write-metadata indication; the processing module establishes a flow entry of a first table according to the flow entry establishment indication, where an action field in the flow entry of the first table is writing the metadata that corresponds to the write-metadata indication and going to a multipath table; and establishes a flow entry of the multipath table according to the write-metadata indication, where in the flow entry of the multipath table, a match field is the metadata, an action field is sending a data stream from at least one forwarding port corresponding to the metadata, and the first table refers to an ingress flow table in the forwarding device. Reuse of the forwarding port is implemented according to the metadata, and storage space of the forwarding device is saved. Moreover, because the match field is the metadata, the action field may include a series of actions, such that equipment vendors can perform hardware optimization for a multipath table to improve performance, for example, optimizing port information identification of a forwarding port, and optimizing implementation of a port selection algorithm. Different from conventional ECMP, a forwarding device implements a solution of a group or a similar function, which easily extends a new characteristic. For example, a series of actions are added before a data packet is forwarded to a port, such that the controller more flexibly controls a forwarding behavior.

Preferably, the metadata includes a port information identifier area, the port information identifier area is used to indicate information about the at least one forwarding port of the forwarding device, and each bit in the port information identifier area correspondingly indicates one forwarding port; and the at least one forwarding port, which sends the data stream, in the action field is in a one-to-one correspondence with the at least one forwarding port, which is indicated by the port information identifier area, of the forwarding device.

Optionally, the processing module 21 being configured to establish a flow entry of the multipath table according to the write-metadata indication is being configured to query whether a flow entry including the metadata exists in the multipath table; and if the flow entry including the metadata exists in the multipath table, being configured to complete establishment of the flow entry of the multipath table; if the flow entry including the metadata does not exist in the multipath table, being configured to extract, according to the write-metadata indication, the information that is indicated by the port information identifier area in the metadata and that is about the at least one forwarding port of the forwarding device, and correspondingly generate the action field in the flow entry of the multipath table.

Figure 12:
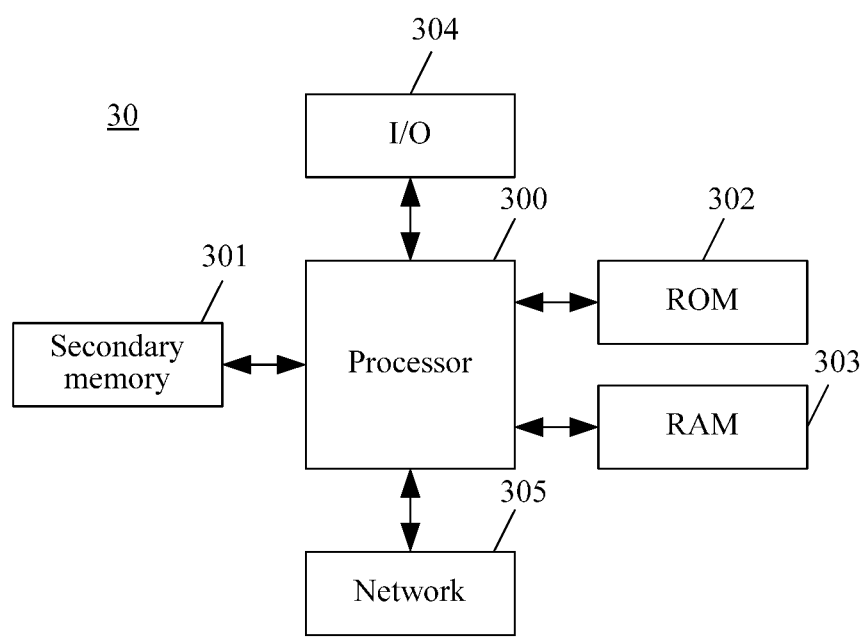
FIG. 12 is a schematic structural diagram of a general network component according to an embodiment of the present disclosure.

FIG. 12 is a schematic structural diagram of a general network component according to an embodiment of the present disclosure. FIG. 12 shows a typical general network component 30, and the general network component 30 is applicable to implementing one or more embodiments of the component and the method that are disclosed in this specification. The network component 30 may include a processor 300 (which may be referred to as a central processing unit (CPU)), and the processor communicates, using a bus, with a storage apparatus including the following items: a secondary memory 301, a read-only memory (ROM) 302, a random-access memory (RAM) 303, an input/output (I/O) apparatus 304, and a network connection apparatus 305. The processor 300 may be used as one or more CPU chips for implementation, or may be a part of one or more application-specific integrated circuits (ASICs).

The network component 30 may be applied to a controller, or may be applied to a forwarding device.

The secondary memory 301 generally includes one or more disk drives or tape drives, and is configured to perform non-volatile storage on data. If a capacity of the RAM 303 is not enough to store all working data, the secondary memory is used as an apparatus for storing overrunning data. The secondary memory 301 may be configured to store a program, and when being selected and executed, the program is loaded into the RAM 303. The ROM 302 is configured to store an instruction and possible data that are read during execution of the program. The ROM 302 is a non-volatile storage apparatus, which generally has a relatively small storage capacity compared with a relatively large storage capacity of the secondary memory 301. The RAM 303 is configured to store volatile data, and may be further configured to store an instruction. Access to the ROM 302 and the RAM 303 is generally quicker than access to the secondary memory 301.

When the network component 30 runs the instruction in the memory, the processor 300 performs method steps described in the method embodiments. For a specific procedure, refer to the method embodiments, and details are not described herein again.

An embodiment of the present disclosure further provides a system for constructing a multipath forwarding rule. The system includes at least one controller shown in FIG. 10 and at least one forwarding device shown in FIG. 11; or the system includes at least one controller to which the network component shown in FIG. 12 is applied and at least one forwarding device to which the network component shown in FIG. 12 is applied. Correspondingly, the controller can perform steps shown in FIG. 4, and can achieve technical effects of the embodiment corresponding to FIG. 4; the forwarding device can perform steps shown in FIG. 6, and can achieve technical effects of the embodiment corresponding to FIG. 6. Further, a process of an interaction between the controller and the forwarding device that are in the system is shown in FIG. 7.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for constructing a multipath forwarding rule and implemented by a controller, the method comprising:
   invoking a multipath algorithm to generate multiple paths for a data stream;
   generating a multiport rule of a forwarding device according to the multiple paths;
   determining that a splitting ratio corresponding to the multiport rule is equal;
   generating, in response to the determining, metadata according to the multiport rule, wherein the metadata comprise information indicating a forwarding port of the forwarding device;
   generating a flow entry establishment indication comprising a write-metadata indication, an indication of going to a multipath table, and the metadata, wherein the metadata correspond to the write-metadata indication, and wherein the flow entry establishment indication directs the forwarding device to establish one or more flow entries based on the metadata and reuse a port combination as the forwarding port for the flow entries when available; and
   sending the flow entry establishment indication to the forwarding device so that the forwarding device selects the forwarding port to forward the data stream.

2. The method of claim 1, wherein the metadata comprise a port information identifier area indicating information about the forwarding port.

3. The method of claim 1, further comprising establishing a transmission control protocol (TCP) data channel between the controller and the forwarding device, wherein the flow entry establishment indication is sent to the forwarding device over the TCP data channel.

4. The method of claim 1, wherein reuse of the port combination as the forwarding port is implemented according to the metadata.

5. A method for constructing a multipath forwarding rule and implemented in a forwarding device, the method comprising:
   receiving from a controller, a flow entry establishment indication comprising a write-metadata indication, an indication of going to a multipath table, and metadata that correspond to the write-metadata indication, wherein the flow entry establishment indication directs the forwarding device to establish one or more flow entries based on the metadata and reuse a port combination as a forwarding port for the flow entries when available;
   establishing a first flow entry of a first table according to the flow entry establishment indication, wherein the first flow entry comprises a first action field for writing the metadata and going to the multipath table, and wherein the first table refers to an ingress flow table in the forwarding device; and
   establishing a second flow entry of the multipath table according to the write-metadata indication, wherein the second flow entry comprises a match field of the metadata and a second action field for sending a data stream from the forwarding port corresponding to the metadata.

6. The method of claim 5, wherein the metadata comprise a port information identifier area indicating information about the forwarding port, and wherein the second action field is for using the forwarding port for performing multipath forwarding to send the data stream.

7. The method of claim 6, wherein the establishing the second flow entry comprises:
   querying whether a flow entry comprising the metadata exists in the multipath table;
   extracting, according to the write-metadata indication and when the second flow entry does not exist in the multipath table, the information; and
   generating, when the second flow entry does not exist in the multipath table, the second action field in the second flow entry.

8. The method of claim 5, further comprising establishing a transmission control protocol (TCP) data channel between the forwarding device and the controller, wherein the flow entry establishment indication is received from the controller device over the TCP data channel.

9. The method of claim 5, wherein reuse of the port combination as the forwarding port is implemented according to the metadata.

10. A controller comprising:
    a memory; and
    a processor coupled to the memory and configured to:
       invoke a multipath algorithm to generate multiple paths for a data stream;
       generate a multiport rule of a forwarding device according to the multiple paths;
       generate, when a splitting ratio corresponding to the multiport rule is equal, metadata according to the multiport rule, wherein the metadata comprise information indicating a forwarding port of the forwarding device;
       generate a flow entry establishment indication comprising a write-metadata indication, an indication of going to a multipath table, and the metadata, wherein the metadata correspond to the write-metadata indication, and wherein the flow entry establishment indication directs the forwarding device to establish one or more flow entries based on the metadata and reuse a port combination as the forwarding port for the flow entries when available; and
       send the flow entry establishment indication to the forwarding device so that the forwarding device selects the forwarding port to forward the data stream.

11. The controller of claim 10, wherein the metadata comprise a port information identifier area indicating information about the forwarding port.

12. The controller of claim 10, wherein the processor is further configured to establish a transmission control protocol (TCP) data channel between the controller and the forwarding device, wherein the flow entry establishment indication is sent to the forwarding device over the TCP data channel.

13. The controller of claim 10, wherein reuse of the port combination as the forwarding port is implemented according to the metadata.

14. A forwarding device comprising:
a memory; and
a processor coupled to the memory and configured to:
receive from a controller a flow entry establishment indication comprising a write-metadata indication, an indication of going to a multipath table, and metadata that correspond to the write-metadata indication, wherein the flow entry establishment indication directs the forwarding device to establish one or more flow entries based on the metadata and reuse a port combination as a forwarding port for the flow entries when available;
establish a first flow entry of a first table according to the flow entry establishment indication, wherein the first flow entry comprises a first action field for writing the metadata and going to the multipath table, and wherein the first table refers to an ingress flow table in the forwarding device; and
establish a second flow entry of the multipath table according to the write-metadata indication, wherein the second flow entry comprises a match field of the metadata and a second action field for sending a data stream from the forwarding port corresponding to the metadata.

15. The forwarding device of claim 14, wherein the metadata comprise a port information identifier area indicating information about the forwarding port, and wherein the second action field is for using the forwarding port for performing multipath forwarding to send the data stream.

16. The forwarding device of claim 15, wherein the processor is further configured to further establish the second flow entry by:
querying whether a flow entry comprising the metadata exists in the multipath table;
extracting, according to the write-metadata indication and when the second flow entry does not exist in the multipath table, the information; and
generating, when the second flow entry does not exist in the multipath table, the second action field in the second flow entry.

17. The forwarding device of claim 14, wherein reuse of the port combination as the forwarding port is implemented according to the metadata.

18. A system for constructing a multipath forwarding rule, the system comprising:
a controller configured to:
invoke a multipath algorithm to generate multiple paths for a data stream;
generate a multiport rule of a forwarding device according to the multiple paths;
generate, when a splitting ratio corresponding to the multiport rule is equal, metadata according to the multiport rule, wherein the metadata comprise information indicating a forwarding port of the forwarding device;
generate a flow entry establishment indication comprising a write-metadata indication, an indication of going to a multipath table, and the metadata, wherein the metadata correspond to the write-metadata indication, and wherein the flow entry establishment indication directs the forwarding device to establish one or more flow entries based on the metadata and reuse a port combination as the forwarding port for the flow entries when available; and
send the flow entry establishment indication to the forwarding device; and
the forwarding device configured to:
receive the flow entry establishment indication from the controller;
establish a first flow entry of a first table according to the flow entry establishment indication, wherein the first flow entry comprises a first action field for writing the metadata and going to the multipath table, wherein the first table refers to an ingress flow table in the forwarding device; and
establish a second flow entry of the multipath table according to the write-metadata indication, wherein in the second flow entry comprises a match field of the metadata and a second action field for sending the data stream from the forwarding port.

19. The system of claim 18, wherein the metadata comprise a port information identifier area indicating information about the forwarding port, and wherein the second action field is for using the forwarding port for performing multipath forwarding to send the data stream.

20. The system of claim 19, wherein, when establishing the second flow entry, the forwarding device is further configured to:
query whether a flow entry comprising the metadata exists in the multipath table;
extract, according to the write-metadata indication and when the second flow entry does not exist in the multipath table, the information; and
generate, when the second flow entry does not exist in the multipath table, the second action field in the second flow entry.

* * * * *